(12) United States Patent
Tseng

(10) Patent No.: US 8,094,441 B2
(45) Date of Patent: Jan. 10, 2012

(54) HOUSING FOR NOTEBOOK COMPUTER AND METHOD FOR MAKING THE SAME

(75) Inventor: Chieh-Fu Tseng, Kaohsiung (TW)

(73) Assignee: Advanced International Multitech Co., Ltd., Kaohsiung (TW)

( * ) Notice: Subject to any disclaimer, the term of this patent is extended or adjusted under 35 U.S.C. 154(b) by 243 days.

(21) Appl. No.: 12/641,168

(22) Filed: Dec. 17, 2009

(65) Prior Publication Data
US 2011/0038116 A1 Feb. 17, 2011

(30) Foreign Application Priority Data
Aug. 14, 2009 (TW) .............................. 98127405 A

(51) Int. Cl.
*G06F 1/16* (2006.01)
(52) U.S. Cl. ............... 361/679.09; 248/537; 206/589; 200/296
(58) Field of Classification Search ........... 248/346.03, 248/118, 689, 125.8, 537, 678; 361/679.09, 361/679.27, 679.55, 679.26, 679.08, 679.19, 361/679.34, 679.58, 679.59; 312/223.2, 312/204; 165/80.3, 104.33, 121; 206/443, 206/763, 387.1, 229, 589; 604/195, 111, 604/135; 200/5 A, 344, 296
See application file for complete search history.

(56) References Cited

U.S. PATENT DOCUMENTS

| | | | | |
|---|---|---|---|---|
| 6,481,578 B2 * | 11/2002 | Hsu | ............................... | 206/589 |
| 2001/0014007 A1 * | 8/2001 | Kim | ............................. | 361/683 |
| 2004/0016628 A1 * | 1/2004 | Hochgesang et al. | ........ | 200/5 A |

* cited by examiner

*Primary Examiner* — Hung Duong
(74) *Attorney, Agent, or Firm* — DLA Piper LLP (US)

(57) ABSTRACT

A method includes the steps of: (a) wrapping a stack of composite prepregs around a plate-shaped mold core to obtain a bag-like preform; (b) removing the mold core from the preform so that a receiving space is left in the preform; (c) inserting an airbag into the receiving space; (d) placing the preform together with the airbag in a mold; (e) inflating the airbag and hot pressing the preform within the mold until the preform is cured so that the receiving space is formed into a motherboard receiving space with a size sufficient to receive a motherboard of the notebook computer and so that the preform is formed into a one-piece flat housing body for the base of the notebook computer; and (f) removing the flat housing body from the mold and the airbag.

11 Claims, 9 Drawing Sheets

HOUSING FOR NOTEBOOK COMPUTER AND METHOD FOR MAKING THE SAME

CROSS-REFERENCE TO RELATED APPLICATION

This application claims priority of Taiwanese Application No. 098127405, filed on Aug. 14, 2009.

BACKGROUND OF THE INVENTION

1. Field of the Invention

This invention relates to computer housings, more particularly to the housings of a notebook computer and a method for making the same.

2. Description of the Related Art

Referring to FIG. 1, a conventional base housing 11 for a base of a notebook computer includes a motherboard receiving space 113 for receiving a motherboard (not shown) of the notebook computer, a base plate 111, a keyboard plate 112 disposed above the base plate 111, and a lateral plate 114 interconnecting the base and keyboard plates 111, 112. A lid housing 12 for a lid of the notebook computer includes a screen receiving space 123 for receiving a flat display screen (not shown) of the notebook computer, a lid plate 121, a frame plate 122 substantially parallel to the lid plate 121, and a lateral plate 124 interconnecting the lid and frame plates 121, 122. The base and lid housings 11, 12 are connected pivotally to each other through a pivot device (not shown).

However, no matter how accurately the base and lid housings 11, 12 are made, a seamline appears between the base and keyboard plates 111, 112 and between the lid and frame plates 121, 122, thereby affecting an aesthetic appearance of the notebook computer.

When the material for making each of the base and lid housings 11, 12 is plastic, through a plastic injection molding process, the base and keyboard plates 111, 112 can be produced so as to form a one-piece base housing, and the lid and frame plates 121, 122 can be produced so as to form a one-piece lid housing. Although the problem of the presence of the seamlines is resolved, the use of plastic results in an appearance that is unsophisticated.

When the material for making each of the base and lid housings 11, 12 is a carbon fiber composite, the process is limited to forming individually the base plate 111, the keyboard plate 112, the lid plate 121, and the frame plate 122 by hot pressing the carbon fiber composite within a mold, after which the base and keyboard plates 111, 112 are connected to form the base housing 11, and the lid and frame plates 121, 122 are connected to form the lid housing 12. The problem of the seamline appearing between the base and keyboard plates 111, 112 and between the lid and frame plates 121, 122 remains unresolved.

If the material for making each of the base and lid housings 11, 12 is an aluminum-magnesium alloy, the base plate 111, the keyboard plate 112, the lid plate 121, and the frame plate 122 are first formed individually by press-forming and machining, after which the base and keyboard plates 111, 112 are interconnected to form the base housing 11, and the lid and frame plates 121, 122 are interconnected to form the lid housing 12. Similarly, the aforesaid problem remains unresolved. Although the alloy material can undergo further processing, such as welding, polishing, etc., so as to resolve the aforesaid problem, production costs increased by such further processing.

SUMMARY OF THE INVENTION

Therefore, an object of the present invention is to provide a method for making housings of a notebook computer which has a base and a lid both made from composite prepregs.

Another object of the present invention is to provide a one-piece molded base housing for a base of a notebook computer that is made from composite prepregs.

Still another object of the present invention is to provide a one-piece molded lid housing for a lid of a notebook computer that is made from composite prepregs.

According to one aspect of this invention, a method is provided for making housings of a notebook computer which includes a base and a lid. The method comprises the steps of: (a) wrapping a stack of composite prepregs around a plate-shaped mold core to obtain a bag-like preform; (b) removing the mold core from the preform so that a receiving space is left in the preform; (c) inserting an airbag into the receiving space; (d) placing the preform together with the airbag in a mold; (e) inflating the airbag and hot pressing the preform within the mold until the preform is cured so that the receiving space is formed into a motherboard receiving space with a size sufficient to receive a motherboard of the notebook computer and so that the preform is formed into a one-piece flat housing body for the base of the notebook computer; and (f) removing the flat housing body from the mold and the airbag. The flat housing body has a base plate and a keyboard plate which are connected parallel to each other and which are spaced apart by the motherboard receiving space.

According to another aspect of this invention, a base housing for a base of a notebook computer comprises a one-piece molded flat housing body that has a base plate, a keyboard plate substantially parallel to the base plate, a motherboard receiving space formed between the base plate and the keyboard plate and adapted to receive a motherboard of the notebook computer, and a lateral connecting part surrounding the motherboard receiving space and interconnecting the base plate and the keyboard plate. The lateral connecting part has an access opening for access to the motherboard receiving space by the motherboard. A plurality of key holes are formed in the keyboard plate.

According to still another aspect of this invention, a lid housing for a lid of a notebook computer comprises a one-piece molded flat housing body that has a lid plate, a frame plate substantially parallel to the lid plate, a screen receiving space formed between the lid plate and the frame plate and adapted to receive a display screen of the notebook computer, and a lateral connecting part surrounding the screen receiving space and interconnecting the lid plate and the frame plate. The lateral connecting part has an access opening for access to the screen receiving space by the display screen. A window opening is formed in the frame plate for exposure of the display screen.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
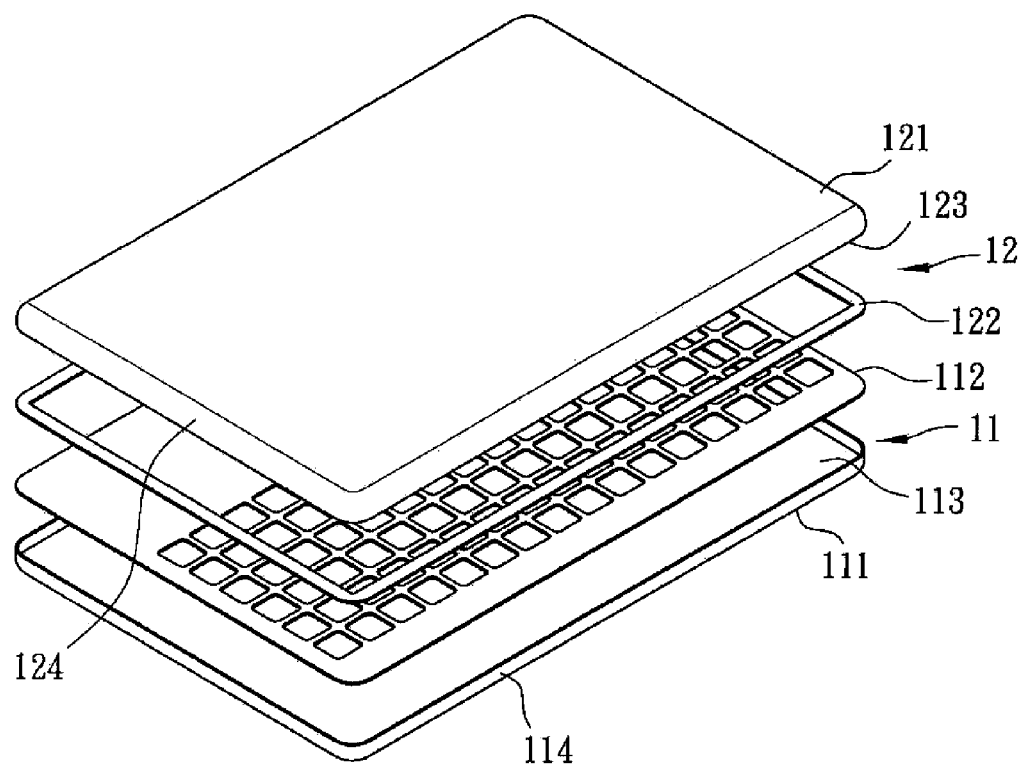
FIG. 1 is an exploded perspective view of a conventional base and lid of a notebook computer.
Figure 2:
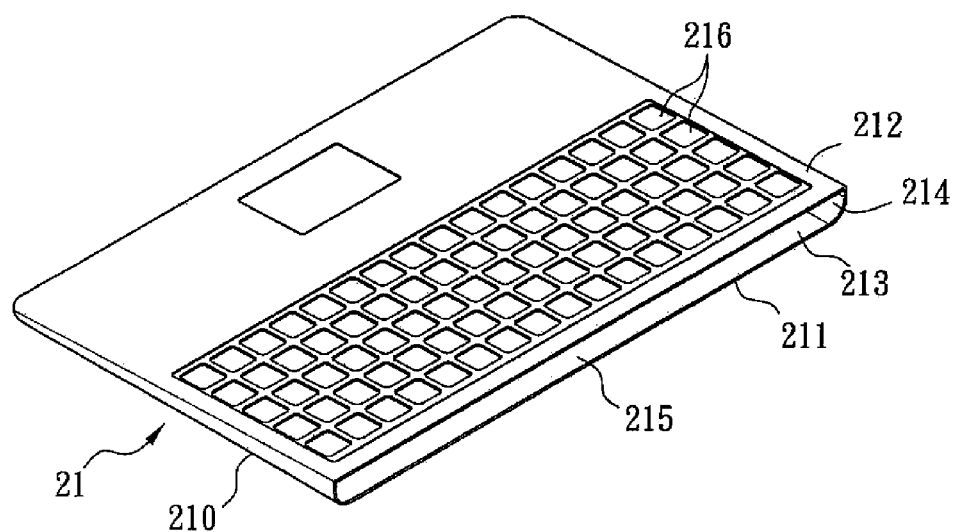
FIG. 2 is a perspective view of a base housing for a base of a notebook computer according to the preferred embodiment of this invention.

Referring to FIG. 2, a base housing 21 for a base of a notebook computer (not shown) according to the preferred embodiment of the present invention is shown to comprise a one-piece molded flat housing body 210 having a base plate 211, a keyboard plate 212 substantially parallel to the base plate 211, a motherboard receiving space 213 formed between the base plate 211 and the keyboard plate 212, and a lateral connecting part 214 surrounding the motherboard receiving space 213, interconnecting the base and keyboard plates 211, 212, and having an access opening 215. A motherboard (not shown) of the notebook computer is inserted into the motherboard receiving space 213 via the access opening 215. A plurality of key holes 216 are formed in the keyboard plate 212, and communicate spatially with the motherboard receiving space 213. The flat housing body 210 is made by hot pressing a stack of composite prepregs within a mold.

Figure 3:
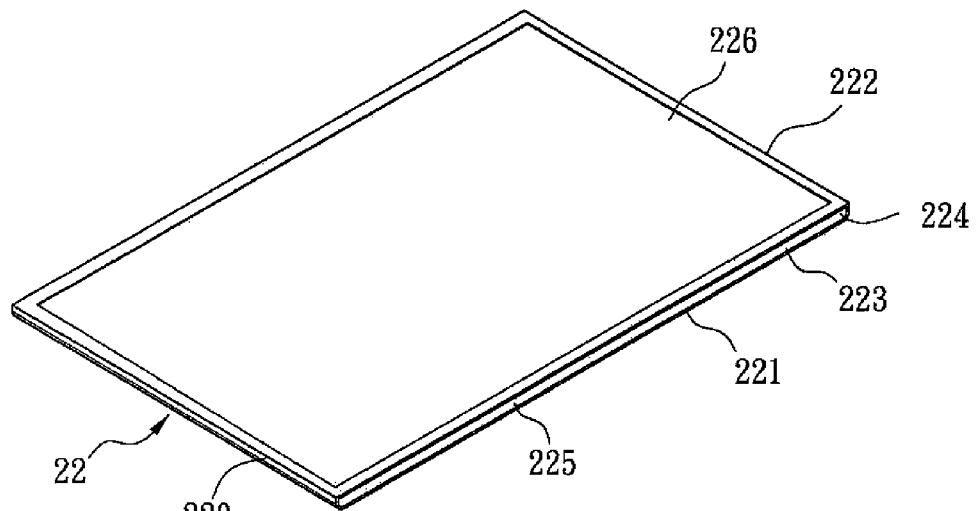
FIG. 3 is a perspective view of a lid housing for a lid of a notebook computer according to the preferred embodiment of this invention.

Referring to FIG. 3, a lid housing 22 for a lid of a notebook computer (not shown) according to the preferred embodiment of the present invention is shown to comprise a one-piece molded flat housing body 220, a lid plate 221, a frame plate 222 substantially parallel to the lid plate 221, a screen receiving space 223 formed between the lid plate 221 and the frame plate 222, and a lateral connecting plate 224 surrounding the screen receiving space 223, interconnecting the lid plate 221 and the frame plate 222, and having an access opening 225. A flat display screen (not shown) of the notebook computer is inserted into the screen receiving space 223 via the access opening 225. A window opening 226 is formed in the frame plate 222 for exposure of the flat display screen. The flat housing body 220 is made by hot pressing composite prepregs within a mold.

The lid housing 220 may be connected pivotally to a conventional base housing of a notebook computer or to the aforesaid base housing 210 through a pivot device (not shown). The base housing 210 may also be connected pivotally to a conventional lid housing of a notebook computer.

Figure 9:
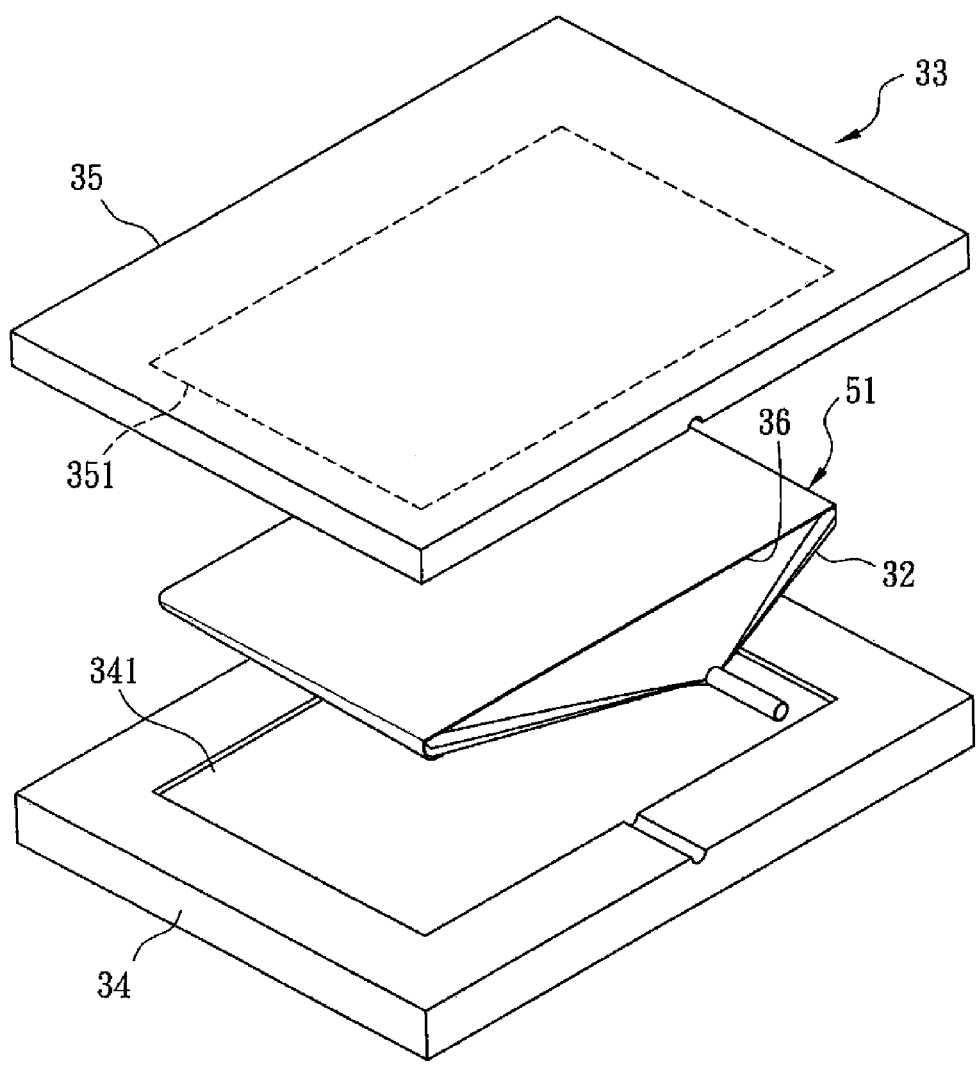
FIG. 9 illustrates the first preform together with a first airbag placed in a first mold.

Referring to FIG. 9, a method for making the base and lid housings 210, 220 of the notebook computer of the present invention includes steps (A) to (L).

Figure 4:
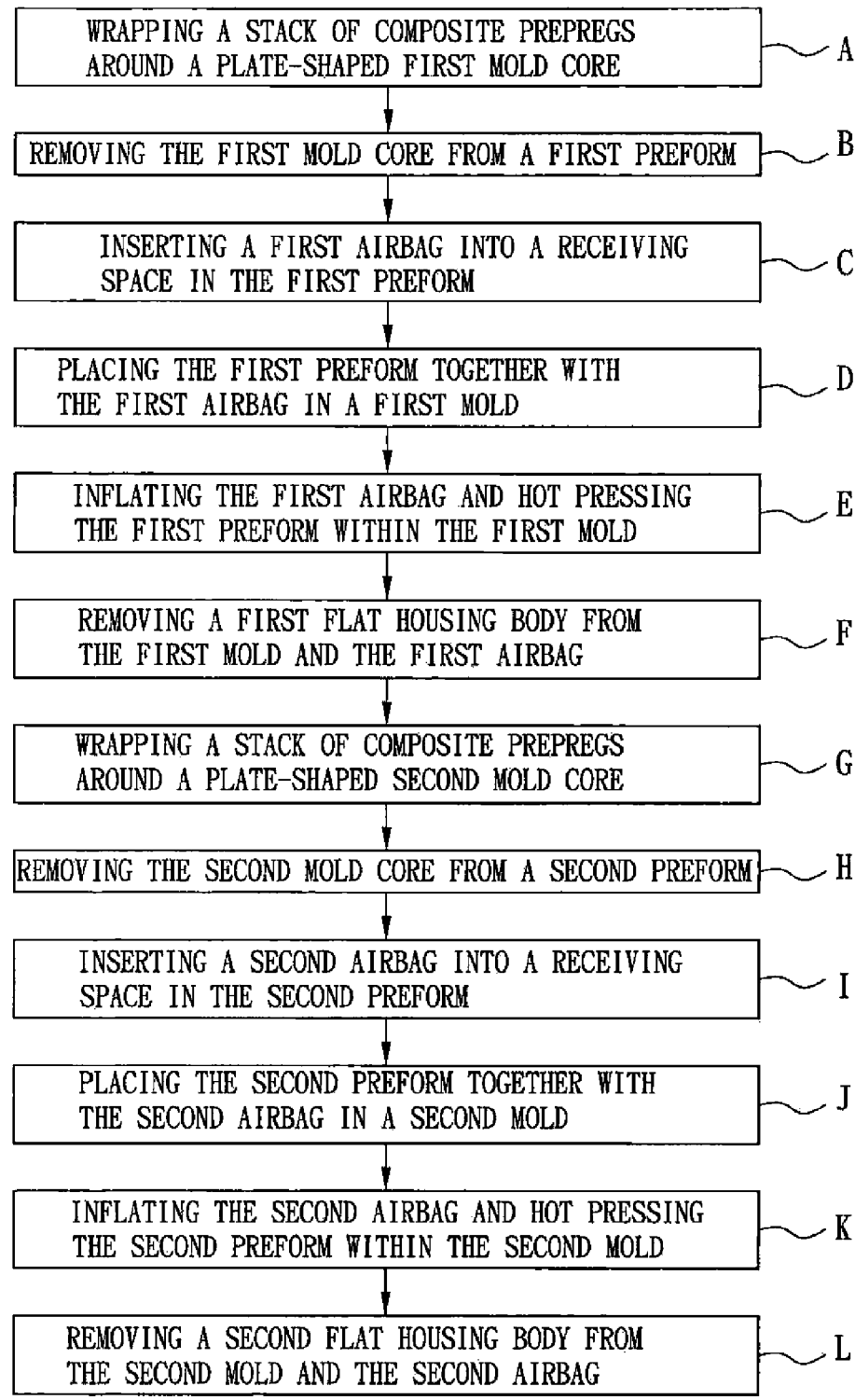
FIG. 4 is a flow chart, illustrating the steps involved in a method for making housings of a notebook computer according to the preferred embodiment of this invention.
Figure 5:
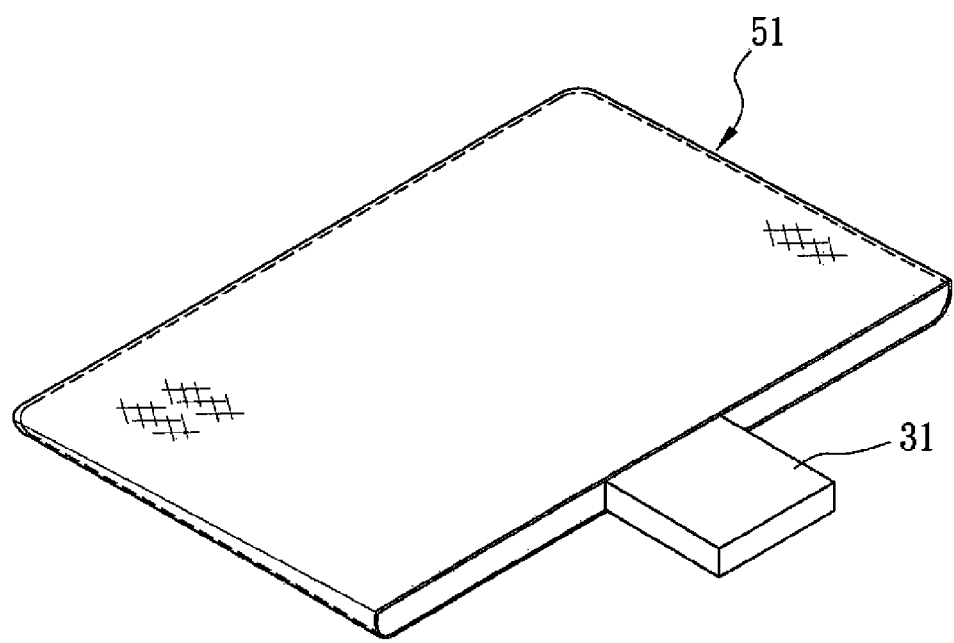
FIG. 5 is a perspective view of a stack of composite prepregs wrapped around a first mold core to form a first preform.

In step (A), with reference to FIG. 4, in combination with FIG. 5, a stack of composite prepregs is wrapped around a plate-shaped first mold core 31 to obtain a bag-like first preform 51. The first mold core 31 has a size substantially corresponding to that of the motherboard of the notebook computer.

Figure 6:
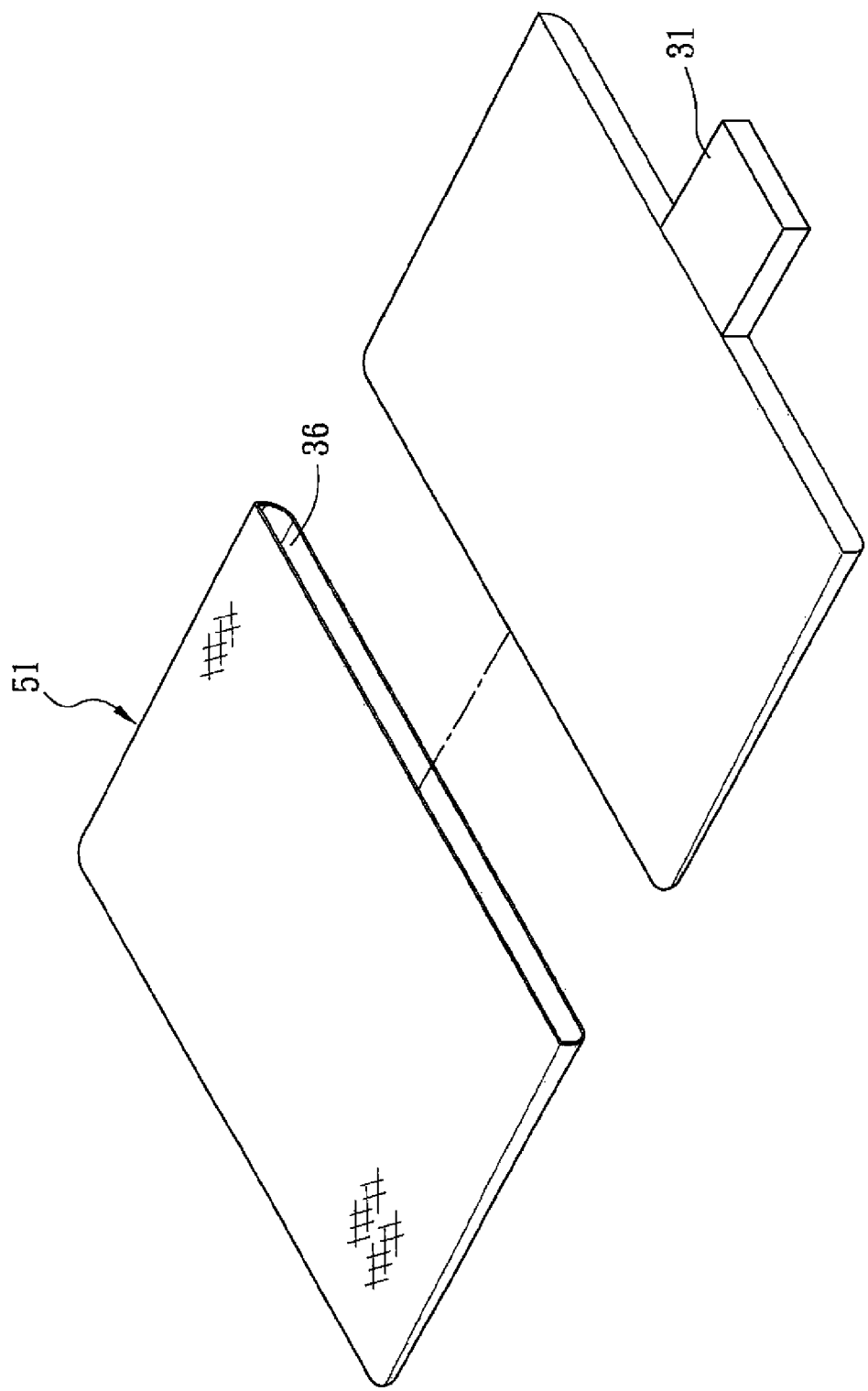
FIG. 6 illustrates the first preform being removed from the first mold core.

In step (B), with reference to FIG. 4, in combination with FIG. 6, the first mold core 31 is removed from the first preform 51 so that a receiving space 36 is left in the first preform 51.

In step (C), a first airbag 32 (see FIG. 9) is inserted into the receiving space 36.

In steps (D) and (E), with reference to FIG. 4, in combination with FIG. 9, the first preform 51 together with the first airbag 32 are placed in a first mold 33. The first mold 33 includes two mold halves 34, 35. One of the mold halves 34 has a mold cavity 341 with a shape substantially corresponding to that of the base plate 211. The other mold half 35 has a mold cavity 351 with a shape substantially corresponding to that of the keyboard plate 212. The first airbag 32 is then inflated, and the first preform 51 is hot pressed between the mold halves 34, 35 of the first mold 33 until the first preform 51 is cured. When the first preform 51 is cured, the receiving space 36 is formed into the motherboard receiving space 213 with a size sufficient to receive the motherboard of the notebook computer. Hence, the first preform 51 is formed into the one-piece first flat housing 21 for the base of the notebook computer, as shown in FIG. 2.

In step (F), the first flat housing 21 is removed from the first mold 33 and the first airbag 32. The first flat housing 21 has a flat housing body 210 which includes the base plate 211 and the keyboard plate 212 that are connected parallel to each other and that are spaced apart by the motherboard receiving space 213.

Figure 7:
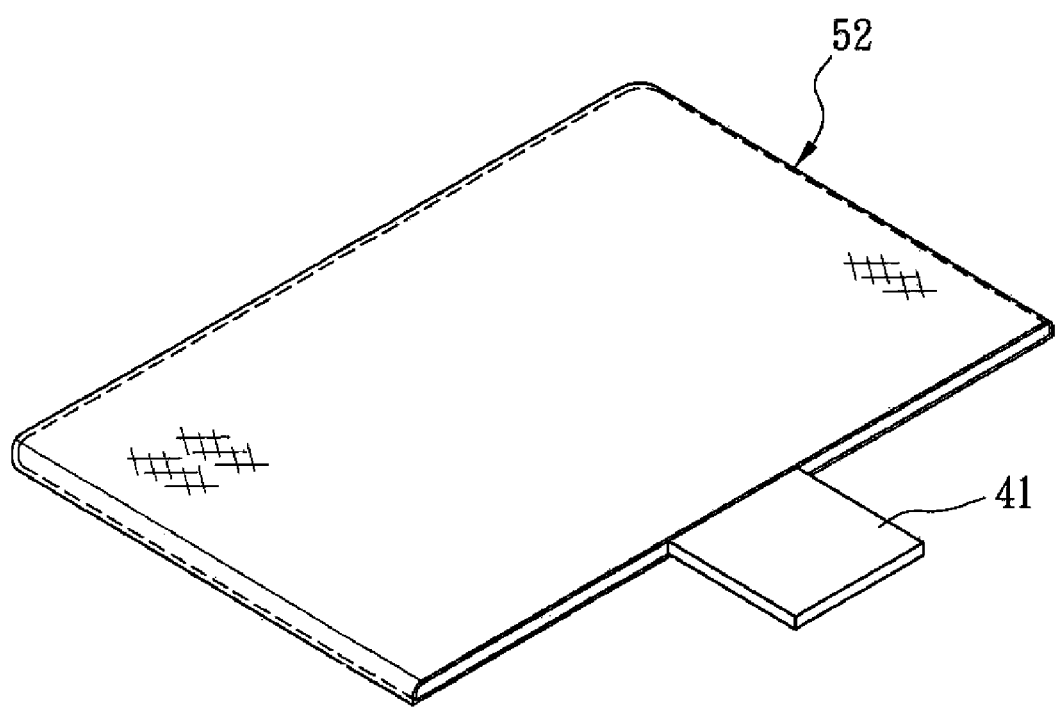
FIG. 7 is a perspective view of a stack of composite prepregs wrapped around a second mold core to form a second preform.

In step (G), with reference to FIG. 4, in combination with FIG. 7, another stack of composite prepregs is wrapped around a plate-shaped second mold core 41 to obtain a bag-like second preform 52. The second mold core 41 has a size substantially corresponding to that of the flat screen display of the notebook computer.

The composite prepregs used in each of steps (A) and (G) include woven fabric which is selected from the group consisting of woven carbon fiber fabric, woven glass fiber fabric, woven aramid fiber fabric, woven basalt fiber fabric, and woven boron fiber fabric.

Figure 8:
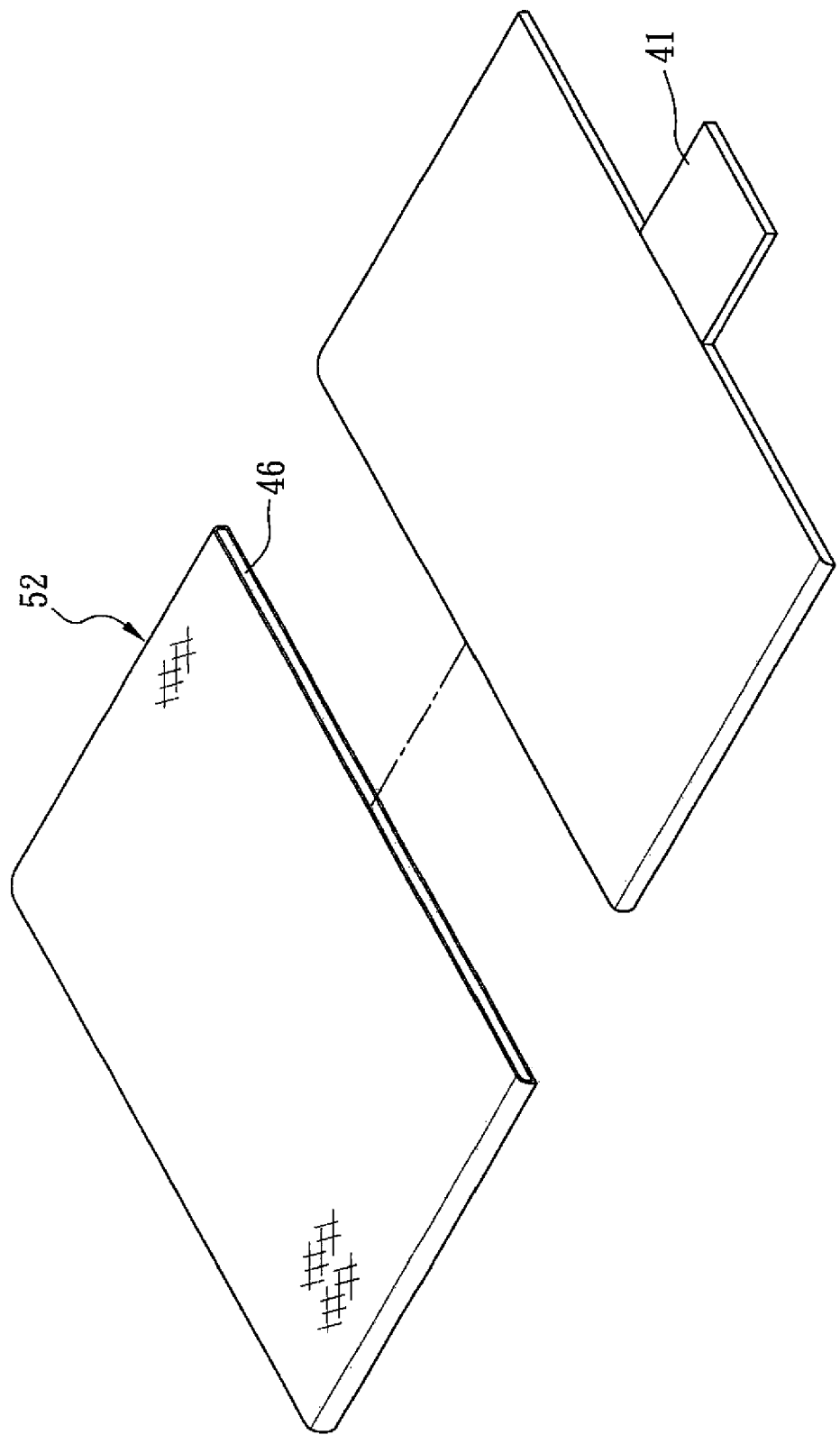
FIG. 8 illustrates the second preform being removed from the second mold core.

In step (H), with reference to FIG. 4, in combination with FIG. 8, the second mold core 41 is removed from the second preform 52 so that a receiving space 46 is left in the second preform 52.

In step (I), a second airbag 42 (see FIG. 10) is inserted into the receiving space 46.

Figure 10:
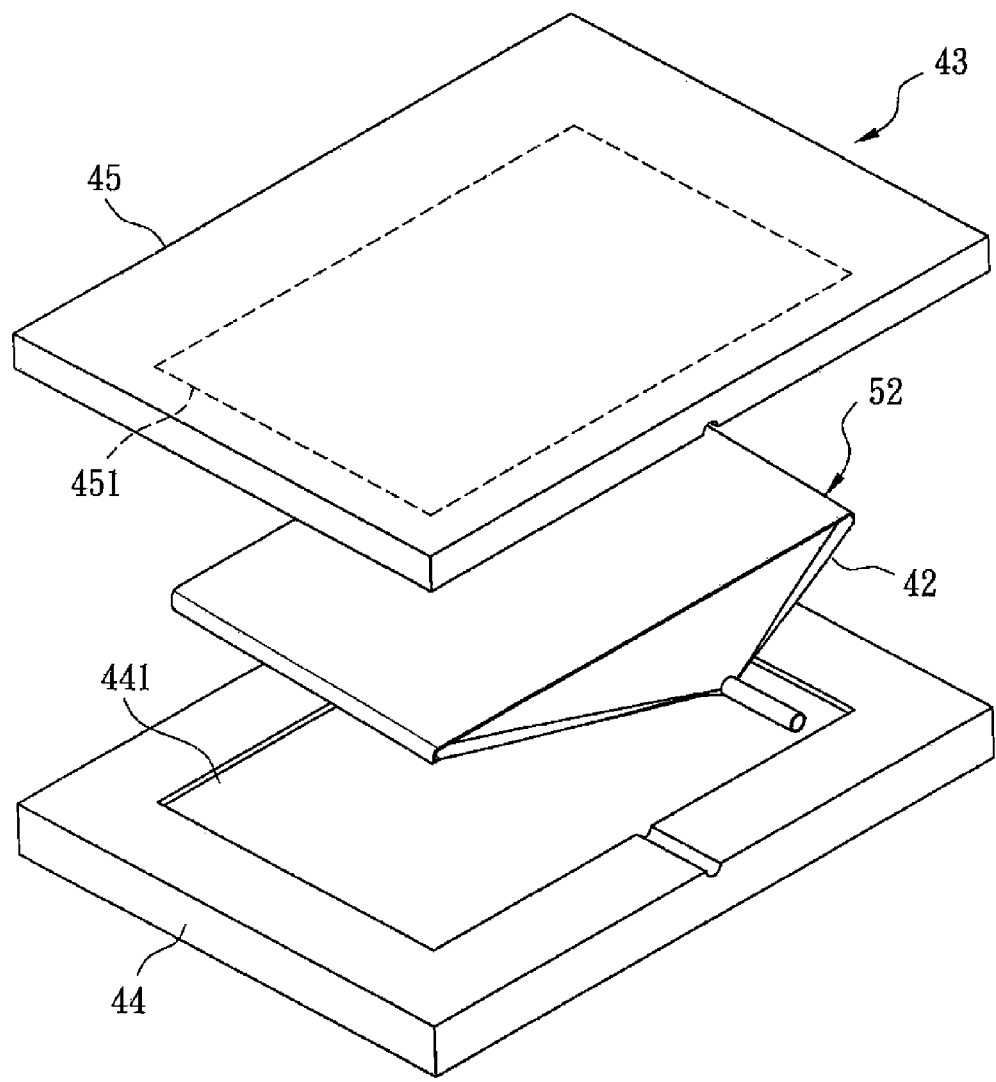
FIG. 10 illustrates the second preform together with a second airbag placed in a second mold.

In steps (J) and (K), with reference to FIG. 4, in combination with FIG. 10, the second preform 52 together with the second airbag 42 are placed in a second mold 43. The second mold 43 includes two mold halves 44, 45. One of the mold halves 44 has a mold cavity 441 with a shape substantially corresponding to that of the lid plate 221. The other mold half 45 has a mold cavity 451 with a shape substantially corresponding to that of the frame plate 222. The second airbag 42 is then inflated, and the second preform 52 is hot pressed between the mold halves 44, 45 of the second mold 43 until the second preform 52 is cured. When the second preform 52 is cured, the receiving space 46 is formed into the screen receiving space 223 with a size sufficient to receive the flat screen display, of the notebook computer. Hence, the second preform 52 is formed into the one-piece first flat housing 22 for the lid of the notebook computer, as shown in FIG. 3.

In step (L), the second flat housing 22 is removed from the second mold 43 and the second airbag 42. The second flat housing 22 has a flat housing body 220 which includes the lid plate 221 and the frame plate 222 that are connected parallel to each other and that are spaced apart by the screen receiving space 223.

It should be noted that the inflating pressure in each of the first and second airbags 32, 42 is equal to about a hot press pressure of the respective one of the first and second molds 33, 43. The temperature, the time, and the pressure of the hot press process are adjusted according to the woven fabric material used in the composite pregregs. Each of the first and second airbags 32, 42 is made of a material selected from the group consisting of nylon, latex, and silicone rubber.

The aforesaid method further comprises the steps of forming key holes 216 in the keyboard plate 212, and forming a window opening 226 in the frame plate 222 for exposure of the flat display screen. The final steps include cutting processes for forming heat sink holes, USB insertion ports for USB connectors, coating, printing, and other subsequent steps that are known in the art.

From the aforementioned description, it is apparent that the present invention provides a novel method for making the base and lid housings 21, 22 for a notebook computer using composite pregregs. Because the base housing 21 has the one-piece molded flat housing 210, and the lid housing 22 has the one-piece molded flat housing 220, the problem of having a seamline between separate components of the base or lid housing 210, 220 can thus be resolved, so that the base and the lid of the notebook computer have an appearance that is attractive and sophisticated.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method for making housings of a notebook computer which includes a base and a lid, the method comprising:
   (a) wrapping a stack of composite pregregs around a plate-shaped first mold core to obtain a bag-like first preform;
   (b) removing the first mold core from the first preform so that a receiving space is left in the first preform;
   (c) inserting a first airbag into the receiving space in the first preform;
   (d) placing the first preform together with the first airbag in a first mold;
   (e) inflating the first airbag and hot pressing the first preform within the first mold until the first preform is cured so that the receiving space in the first preform is formed into a motherboard receiving space with a size sufficient to receive a motherboard of the notebook computer and so that the first preform is formed into a one-piece first flat housing for the base of the notebook computer; and
   (f) removing the first flat housing from the first mold and the first airbag;
      wherein the first flat housing has a flat housing body which includes a base plate and a keyboard plate which are connected parallel to each other and which are spaced apart by the motherboard receiving space.

2. The method of claim 1, further comprising forming key holes in the keyboard plate.

3. The method of claim 1, wherein the first mold includes two mold halves one of which has a mold cavity with a shape substantially corresponding to that of the base plate and the other one of which has a mold cavity with a shape substantially corresponding to that of the keyboard plate.

4. The method of claim 1, further comprising:
   (g) wrapping a stack of composite pregregs around a plate-shaped second mold core to obtain a bag-like second preform;
   (h) removing the second mold core from the second preform so that a receiving space is left in the second preform;
   (i) inserting a second airbag into the receiving space in the second preform;
   (j) placing the second preform together with the second airbag in a second mold;
   (k) inflating the second airbag and hot pressing the second preform within the second mold until the second preform is cured so that the receiving space in the second preform is formed into a screen receiving space with a size sufficient to receive a display screen of the notebook computer and so that the second preform is formed into a one-piece second flat housing for the lid of the notebook computer; and
   (l) removing the second flat housing from the second mold and the second airbag;
      wherein the second flat housing has a flat housing body which includes a lid plate and a frame plate which are interconnected in a parallel manner and which are spaced apart by the screen receiving space.

5. The method of claim 4, further comprising forming a window opening in the frame plate for exposure of the display screen.

6. The method of claim 4, wherein the second mold includes two mold halves one of which has a mold cavity with a shape substantially corresponding to that of the lid plate and the other one of which has a mold cavity with a shape substantially corresponding to that of the frame plate.

7. The method of claim 4, wherein an inflating pressure in each of the first and second airbags is equal to about a hot press pressure of the respective one of the first and second molds.

8. The method of claim 4, wherein the composite pregregs include woven fabric which is selected from the group consisting of woven carbon fiber fabric, woven glass fiber fabric, woven aramid fiber fabric, woven basalt fiber fabric, and woven boron fiber fabric.

9. The method of claim 4, wherein each of the first and second airbags is made of a material selected from the group consisting of nylon, latex, and silicone rubber.

10. A base housing for a base of a notebook computer, comprising:
    a one-piece molded flat housing body that has a base plate, a keyboard plate substantially parallel to said base plate, a motherboard receiving space formed between said base plate and said keyboard plate and adapted to receive a motherboard of the notebook computer, and a lateral connecting part surrounding said motherboard receiving space and interconnecting said base plate and said keyboard plate, said lateral connecting part having an access opening for access to said motherboard receiving space by the motherboard; and
    a plurality of key holes formed in said keyboard plate.

11. A lid housing for a lid of a notebook computer, comprising;
    a one-piece molded flat housing body that has a lid plate, a frame plate substantially parallel to said lid plate, a screen receiving space formed between said lid plate and said frame plate and adapted to receive a display screen of the notebook computer, and a lateral connecting part surrounding said screen receiving space and interconnecting said lid plate and said frame plate, said lateral connecting part having an access opening for access to said screen receiving space by the display screen; and a window opening formed in said frame plate for exposure of the display screen.

* * * * *